United States Patent [19]

Haque

[11] Patent Number: 4,913,808

[45] Date of Patent: Apr. 3, 1990

[54] SUBCOMPACT INTERCHANGEABLE CARTRIDGE DRINKING WATER PURIFICATION SYSTEM

[76] Inventor: Maqsood Haque, 19400 Sorenson Ave. #220, Cupertino, Calif. 95014

[21] Appl. No.: 252,065

[22] Filed: Oct. 3, 1988

[51] Int. Cl.⁴ .............................................. B01D 27/02
[52] U.S. Cl. ..................... 210/93; 210/266; 210/282; 210/290
[58] Field of Search ............... 210/96.1, 266, 282–284, 210/290, 900, 93

[56] References Cited

U.S. PATENT DOCUMENTS

| | | | |
|---|---|---|---|
| 3,327,859 | 6/1967 | Pall ...................... | 210/282 |
| 3,823,824 | 9/1972 | Close ..................... | 210/86 |
| 3,870,033 | 3/1975 | Faylor et al. ......... | 210/900 |
| 3,883,429 | 3/1974 | Hanford ............... | 210/104 |
| 4,066,551 | 1/1976 | Stern .................... | 210/282 |
| 4,109,986 | 6/1973 | Burris et al. ......... | 210/139 |
| 4,151,092 | 7/1977 | Grimm et al. ........ | 210/256 |
| 4,196,081 | 4/1980 | Pavia ................... | 210/283 |
| 4,252,650 | 1/1980 | Mas et al. ............ | 210/86 |
| 4,252,654 | 6/1979 | Leitzke et al. ....... | 210/760 |
| 4,298,475 | 7/1980 | Gartner ............... | 210/266 |
| 4,312,754 | 7/1980 | La Fontaine ........ | 210/267 |
| 4,389,311 | 7/1981 | La Freniere ........ | 210/198.1 |
| 4,477,347 | 6/1983 | Sylva ................... | 210/232 |
| 4,561,967 | 5/1984 | Houser ................ | 210/290 |
| 4,609,466 | 10/1984 | McCausland et al. | 210/244 |
| 4,749,481 | 8/1988 | Wheatly .............. | 210/282 |

*Primary Examiner*—Ivars Cintins
*Attorney, Agent, or Firm*—Cushman, Darby & Cushman

[57] ABSTRACT

A domestic subcompact portable unit with one comprehensive replacable cartridge for the purification of drinking water in the super pure form through the use of two stage activated carbon, multilayer mixed-bed demineralization and submicron filtration. The system can be very conveniently installed in the kitchen sink faucet with easy interchange of the combination cartridge to provide drinking water in the purest form free from organics, bacteria, minerals and suspended particles.

5 Claims, 2 Drawing Sheets

SUBCOMPACT INTERCHANGEABLE CARTRIDGE DRINKING WATER PURIFICATION SYSTEM

BACKGROUND OF THE INVENTION

Water is the universal solvent, pure water is non-existent in nature due to its dissolving properties. The contamination of drinking water has become one of the major environmental issues of the present era. Organics are one of the major source of contaminants in drinking water. They are derived from the decomposition of plants and animals,natural organics, synthetic organics, both industrial and agricultural pollution and the reaction of organics during water treatment. Based upon the data collected fifty different pesticides and six halogenated organic chemicals have been detected in the wells that are one of the prime sources of domestic water supply. The most ubiqitous synthetic organic compounds found in drinking water are the trihalomethane, predominantly chloroform, the by-product of water treatment when chlorine reacts with natural organic materials including aquatic humic material in water. The range of organic compounds in drinking water amounts to hundreds, however most of the organic components in drinking water are non-volatile substances with molecular weights in excess of 1000.

Regarding inorganic contaminants besides the most harmful arsenic, cadmium, lead, mercury and chromium, the naturally occuring asbestos and selinium have been found in some of the urban water systems. Nitrates formed by oxidation of ammonium ions with microorganisms in water, is one of the most common contaminants in agricultural areas.It is a well establiched fact that a large number of the contaminants in drinking water have harmful health effects. Although carcinogenic effects of some of the contaminants in the water have been established, the long term harmful effects of the wide variety of these contaminants in the drinking water is difficult to comprehend.

A large number of microorganisms also occur as contaminants in the drinking water. The human health implications of microbiological contamination of water are more severe than that of chemical contamination.-The aquatic microbiology are diverse and include bacteria, virus, algae, fungi, and protozoa, and their size is an important factor in their treatment and removal.

Another source of contaminants of significant harm to human health are finely divided and suspended particles from soil, silts, sediments colloids and asbestos fibres in drinking water.

In view of the fact that drinking water containing numerous contaminants, the adverse health effects of some of which are known, and majority of them are yet unknown, it is imperative that water for human internal consumtion must undergo purification at the point of use.

SUMMARY OF THE INVENTION

The system is a subcompact portable water purification unit that could be installed through the kitchen faucet,that is capable of providing water in the purest form free from organics, minerals, bacteria and suspended particles.

The water in the system is passed through a series of purification beds to eliminate the undesirable constituents present in the water. The complete series of this purification system is to serve as a one composite cartridge capable of being conveniently replaced when approaching exhaustion.

The influent water passes through a bed of activated carbon filter for the removal of organic compounds of health concern, the removal of undesirable taste and odor and to impart improved taste to water. The water then enters a mixed bed of anion and cation exchange resins that remove all of the inorganic compounds replacing the radicals with hydrogen and hydroxyl ions. This results in the production of ultra demineralized water with resistance of over one meg ohm-cm.

The water next passes through another bed of activated carbon. The purpose is to removed the humic substances of the ion exchange resin and any other fouling effect of the demineralization process.

Finally the water is lead through a final submicron filter to filter out all suspended, and colloidal particles present in the water. This ultra fine filter is also capable of removing 99.9 percent of the bacteria present in the water. The filtration process is dependant on the water quality physical characteristics of the particulate and the surface of the filter media.

BRIEF DESCRIPTION OF DRAWINGS.

In the drawings wherein like reference numerals represent like parts.

DETAILED DESCRIPTION OF THE PREFERRED EMBODIMENT

Figure 1:
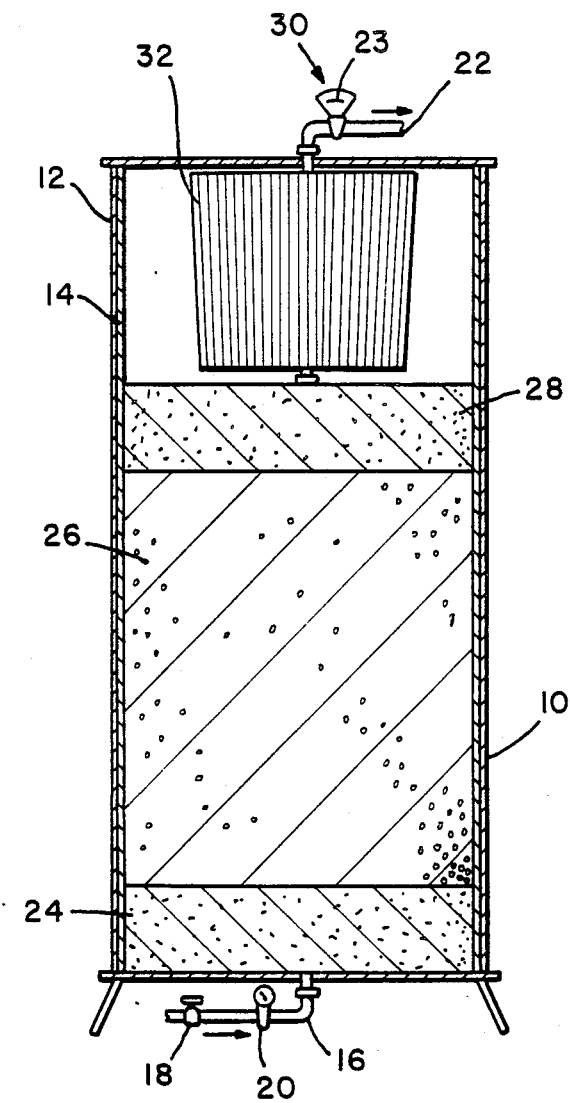
FIG. 1. is a cross-sectional view of an embodiment of the water purifying apparatus with water inlet and outlet lines.
Figure 2:
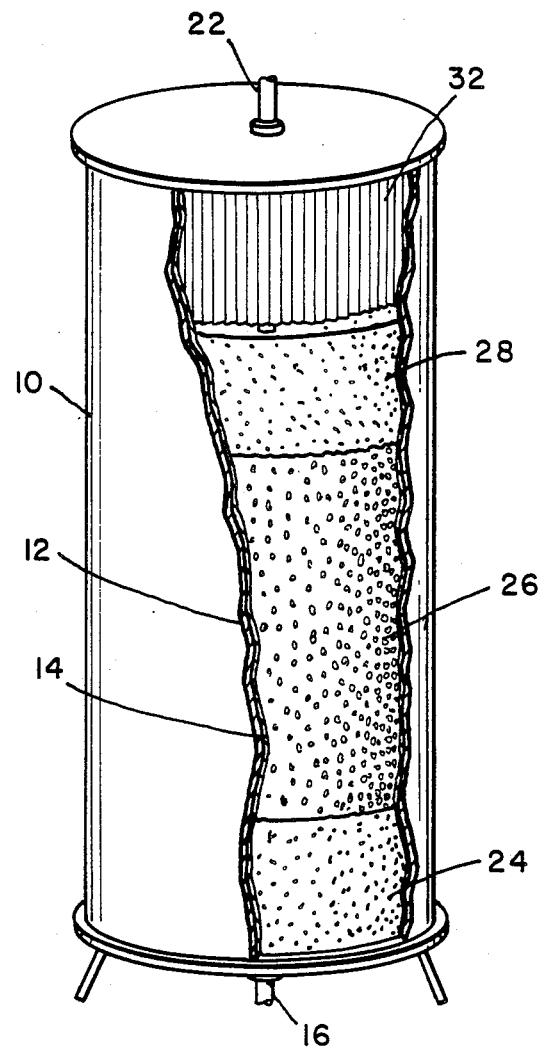
FIG. 2. is an internal view of the different cartridge treatment beds and final filter inside the housing.

In accordance with FIG. 1 the embodiment designed for the purification of water is designated as 10. The water purification system comprises a stainless steel housing 12 that contains the composite replaceable cartridge 14. The main housing 12 is connected to the body of the housing joining the first activated charcoal bed 24. The inlet tubing 16 can be conveniently assembled and disassembled without the need of any tool at the time of replacing of the composite cartridge 14. Flow through inlet tubing 16 can be controlled by inlet valve 18, and is measured by flow sensor 20. The top part of the stainless steel housing 12 is connected to a long outlet tubing 22 that serves as an outlet for the purified water to be collected in one gallon plastic bottles commonly used for bottled water. This outlet tubing 22 is fitted with a resistivity sensor unit 30 that indicates degree of purification of water. A light bulb 23 installed in the sensor 30 is lighted so long the degree of purity of water exceeds the specified condition. The outlet tubing 22 can again be conveniently rotated in any position for collection of super pure water and can be conveniently assembled and disassembled without the need of any tool.

The water purification system comprises a composite cartridge 14 consisting of successive purification beds for the removal of contaminants from the water. The inflowing water in the cartridge first passes through a bed of activated carbon 24 which acts as an adsorbent. As the water passes through the activated carbon bed 24, the organic contaminants including odor and taste producing compounds, synthetic industrial/agricultural compounds and disinfection by-products in the water get treated with the activated carbon. In its adsorption with activated carbon, the water is brought in contact with adsorption particles resulting in the adhesion of the gas, vapor or dissolved materials on the surface. All of the organic materials,including natural, synthetic, disinfection by-products and the volatile organics in water, are virtually adsorbed by activated carbon during its passage through the carbon bed.The taste, odor and color producing compounds of natural and industrial origin are readily adsorbed by activated carbon resulting in taste and odor free clear drinking water. Some inorganic materials having adverse health effects including mercury, arsenic, lead and flouride are also removed by adsorption in activated carbon. Again the activated carbon not only dechlorinates the municipal treated water, but also readily adsorbs the principal by-products of chlorinated water of health concern. Viruses in water are also adsorbed in the activated carbon to a great degree depending upon the pH of the water.

The water is then passed through a mixed bed of anion and cation exchange resins 26 contained in the same cartridge. Water after passing through the mixed bed ofsynthetic resins is completely deionized, since all cations have been replaced by hydrogen ions and all anions by hydroxyl ions. The effluent water is virtually free of any mineral contaminants, a quality comparable with distilled water. This mixed-bed exchanger has the advantage of producing water with resistance approximating theoretical perfection and a more balanced and consistent pH ranging between 7.0 to 7.5. Variations in the quality of water entering the exchanger and the variation in the flow rates of water have vitually no effect on the effluent water quality.

The demineralized effluent water from the ion exchange bed then enters the second layer of activated carbon 28. Activated carbon by its very nature has a large affinity for organics which is attributed to its large surface area in the range of 500 to 1500 m/gm. Although the prior activated carbon treatment greatly reduces the chance of organic fouling during the ion exchange treatment process, this second activated carbon bed is utilized to adsorb products of organic fouling if any. This activated carbon treatment would remove amines that may leak into the water from the ion- exchange cartridge. Finally this activated carbon bed serves to completely adsorbs the residual organics, chlorine and chlorination by products if any to provide odorfree,completely clear drinking water of pleasant taste.

The effluent from the second bed 28 of activated carbon filtration is connected through a pipe to the final filtration system 32. Here the sub micron filtration system 32 serves a two-fold purification effect. The micro filtration serves as an important process in the removal of pathogenic organisms and prevention of water-borne diseases. The ability of the submicron filter to remove bacteria from drinking water and reduction of coliform count greatly enhances drinking water quality. The other aspect of the submicron filtration system is its utilization to remove suspended particles, sediments, silts and colloidal particles to the size of one tenth of a millimicron and above. The final filtration system is a disposable nylon media capsule having advantage that it can maintain the water quality irrespective of the inflow quality;as the capsule become older only the flow rate changes.

I claim:

1. A water purifying device comprising:
    a container having a water inlet and a water outlet, said container being formed for replaceably holding a water filtration cartridge threin;
    said water filtration cartridge including four layers of water filtration material disposed within said container such that water from said inlet will pass through each said layer of filtration materials to said outlet;
    said layers of filtration materials including, in sequence, a first layer of activated carbon, a second layer of ion exchange resins, a third layer of activated carbon, and a fourth layer of sub-micron filtration material.

2. A water treatment device as claimed in claim 1 further comprising a resistivity sensor engaged with said water outlet for indicating the purity of water flowing through said water outlet.

3. A water treatment device as claimed in claim 1 wherein said ion exchange resins include a mixture of anion exchange resins and cation exchange resins.

4. A water treatment device as claimed in claim 1 wherein said ion exchange resins include high capacity mixed bed synthetic resins.

5. A water treatment device as claimed in claim 1 wherein said sub-micron filtration material is nylon.

* * * * *